(12) United States Patent
Corin

(10) Patent No.: US 8,061,476 B2
(45) Date of Patent: Nov. 22, 2011

(54) SOUND DAMPENING FLOW CHANNEL DEVICE

(75) Inventor: Ralf Corin, Hässelby (SE)

(73) Assignee: Tumane Enterprises Limited, Grand Turk (TC)

( * ) Notice: Subject to any disclaimer, the term of this patent is extended or adjusted under 35 U.S.C. 154(b) by 26 days.

(21) Appl. No.: 11/886,551

(22) PCT Filed: Mar. 15, 2006

(86) PCT No.: PCT/SE2006/050031
§ 371 (c)(1),
(2), (4) Date: May 21, 2008

(87) PCT Pub. No.: WO2006/098694
PCT Pub. Date: Sep. 21, 2006

(65) Prior Publication Data
US 2009/0050404 A1 Feb. 26, 2009

(30) Foreign Application Priority Data
Mar. 18, 2005 (SE) ........................ 0500630

(51) Int. Cl.
*F01N 1/08* (2006.01)

(52) U.S. Cl. .................. 181/224; 181/279; 181/280

(58) Field of Classification Search .............. 181/224, 181/225, 247, 264, 267, 278, 279, 280
See application file for complete search history.

(56) References Cited

U.S. PATENT DOCUMENTS

| 2,270,825 | A | * | 1/1942 | Parkinson et al. | 181/224 |
|---|---|---|---|---|---|
| 2,484,826 | A | * | 10/1949 | Harley | 181/264 |
| 2,484,827 | A | * | 10/1949 | Harley | 181/268 |
| 2,759,556 | A | * | 8/1956 | Baruch | 181/203 |
| 2,853,147 | A | * | 9/1958 | D'Eustachio | 181/224 |
| 2,896,743 | A | * | 7/1959 | Bradshaw | 55/308 |
| 2,950,776 | A | * | 8/1960 | Stephens | 181/224 |
| 2,974,745 | A | * | 3/1961 | Kristiansen | 181/224 |
| 3,018,840 | A | * | 1/1962 | Bourne et al. | 181/224 |
| 3,726,359 | A | * | 4/1973 | Dierl et al. | 181/224 |
| 3,819,334 | A | * | 6/1974 | Yoshida et al. | 422/173 |
| 4,050,913 | A | * | 9/1977 | Roach | 96/381 |

(Continued)

FOREIGN PATENT DOCUMENTS

DE      34 22 698      12/1985

(Continued)

OTHER PUBLICATIONS

Russian Search Report (translation attached) dated Jan. 20, 2010 issued in Russian Application No. 2007134064/06(037217).

(Continued)

*Primary Examiner* — Elvin G Enad
*Assistant Examiner* — Jeremy Luks
(74) *Attorney, Agent, or Firm* — Drinker Biddle & Reath LLP

(57) ABSTRACT

The invention presents a sound dampening flow channel device defining at least one flow channel having an inlet opening and an outlet opening, the flow channel being at least partly delimited by at least one acoustic energy dissipative wall. The outlet opening of the flow channel cannot be seen from the inlet opening and vice versa. Preferably, the acoustic energy dissipative wall presents, in relation to the interior of the flow channel, a smooth curvature.

21 Claims, 7 Drawing Sheets

U.S. PATENT DOCUMENTS

| | | | |
|---|---|---|---|
| 4,069,768 A * | 1/1978 | Matsumoto et al. | 105/452 |
| 4,236,597 A * | 12/1980 | Kiss et al. | 181/224 |
| 4,287,962 A * | 9/1981 | Ingard et al. | 181/224 |
| 4,786,299 A * | 11/1988 | DeMarco | 96/382 |
| 5,504,280 A * | 4/1996 | Woods | 181/235 |
| 6,533,065 B2 * | 3/2003 | Zanker | 181/264 |
| 2004/0021342 A1* | 2/2004 | Fujimoto | 296/193.11 |
| 2004/0074694 A1 | 4/2004 | Heed | |
| 2005/0016792 A1* | 1/2005 | Graefenstein | 181/253 |

FOREIGN PATENT DOCUMENTS

| | | |
|---|---|---|
| DE | 197 22 866 | 11/1998 |
| FR | 921160 | 4/1947 |
| GB | 303997 | 1/1929 |
| GB | 721860 | 1/1955 |
| GB | 763327 | 12/1956 |
| GB | 1 536 164 | 12/1978 |
| RU | 1773279 | 10/1992 |
| SU | 195791 | 6/1967 |
| SU | 530957 | 10/1976 |
| SU | 802575 | 2/1981 |
| SU | 1002622 | 3/1983 |
| SU | 1106914 | 8/1984 |
| SU | 1240928 | 6/1986 |
| SU | 1262068 | 10/1986 |
| SU | 1267016 | 10/1986 |
| SU | 1346830 | 10/1987 |
| SU | 1370263 | 1/1988 |
| SU | 1557343 | 4/1990 |
| SU | 1560739 | 4/1990 |
| SU | 1590576 | 9/1990 |
| WO | 02/089110 | 11/2002 |

OTHER PUBLICATIONS

Chinese First Office Action (translation attached) mailed Mar. 11, 2010 issued in Chinese Application No. 200680008754.5.

* cited by examiner

US 8,061,476 B2

SOUND DAMPENING FLOW CHANNEL DEVICE

CROSS REFERENCE TO RELATED APPLICATIONS

This application is the National Stage of International Application No. PCT/SE2006/050031 filed Mar. 15, 2006, and claims benefit of Swedish Application No. 0500630-9 filed Mar. 18, 2005.

TECHNICAL FIELD

The present invention relates to a sound dampening flow channel device defining at least one flow channel.

BACKGROUND OF THE INVENTION

Traditionally, sound attenuators or mufflers are used to reduce unwanted sounds in ducts with flowing air. Such a sound attenuator or muffler is usually designed as an add-on component, inserted somewhere along the duct. Among sound attenuators, there are resistive and reactive types.

A purely reactive type reduces the sound only by means of a difference regarding the geometrical dimension in relation to the duct, and can be regarded as a reflector and not an energy dissipative silencer.

A resistive silencer often contains resistive materials like pressed glass or mineral fibre wools, plastic foams, or polyester fibres as energy absorbing material. Thereby, placing the absorbing material, in the form of baffles or sidewall linings, in the flowing stream is the most effective way to reduce sound, since the sound is present in the stream. However, this will inevitably cause unwanted effects like a pressure drop, noise generated by turbulence, and reduced volume flow.

In order to avoid or reduce a pressure loss in the duct of a resistive silencer, wall-linings can be placed outside the original duct, whereby the duct has to be partly perforated in order to let the sound dissipate into the porous material, and an airtight wall has to be provided behind the absorbing material in order to avoid pressure loss and leakage. However, a disadvantage with such a solution is that it requires space outside the stream flow duct, and such space can be limited or non-existing in many applications.

Other solutions include a baffle in a sound absorbing material inserted in the stream flow duct, or a vane inserted in the stream flow duct to reduce turbulence. Such vanes are often provided in ducts bends.

WO02/089110 discloses a silencer design using microperforated linings on walls and baffles in one or several layers, using no fibrous absorbing materials. The air flow passes parallel to the surface of the using the non-moving air inside the lining or the baffle as a non-locally reacting absorber. A disadvantage with this solution is that the volume behind the linings or the baffles does not participate as a flow duct, but rather reduces the flow cross-section area.

GB1536164 describes an acoustic attenuator using angled vanes in a straight duct in order to guide the airflow and the sound field. The vanes form a plurality of flow channels distributed both in the transverse and longitudinal direction of the duct. The sound field is guided so that the sound waves impact against many vanes, which are covered with a porous material, so that the waves loose energy on every impact. Acoustically the vanes are mainly reflective. However, due to the angle of the vanes, and the large thicknesses of the vanes and the absorption layers, the vanes will cause a reduction of the flow cross-section. Further, the bending of the flow to a zigzag shape will cause a pressure drop.

SUMMARY

An object of the invention is to provide a sound dampening flow channel device that allows an effective sound dampening while minimising the pressure drop of a fluid flow through the device.

Another object is to provide a sound dampening flow channel device that allows an effective sound dampening while minimising the pressure drop of a fluid flow through the device, whereby the dimensions of the device are kept low.

Another object is to provide a sound dampening flow channel device that allows an effective sound dampening while minimising the pressure drop of a fluid flow through the device, whereby a reduction of the flow cross-section is avoided or minimized.

These objects are met with a sound dampening flow channel device defining at least one flow channel comprising an inlet opening and an outlet opening, the flow channel being at least partly delimited by at least one acoustic energy dissipative wall, whereby the outlet opening of the flow channel can not be seen from the inlet opening and vice versa.

This device will dampen sound waves in a flowing fluid with a minimum interference of the fluid flow itself, i.e. with a minimum pressure drop. The reason is that, since the outlet opening of the flow channel can not be seen from the inlet opening and vice versa, the sound waves are forced to impact against the at least one acoustic energy dissipative wall, while the fluid flow itself is allowed to pass. Thus, the invention will provide for deflection of the sound so that it is forced to "bounce around" in the flow channel, and loose energy upon every impact. A way of expressing the invention in acoustic terms is that the acoustic energy dissipative wall has an acoustic impedance which corresponds to about 0.1 to 10, preferably 0.5 to 5, and most preferably 1 to 3 times the wave impedance of the flowing fluid. The invention uses the inherent differences between interacting properties, of the wall material, with regards to the flow field and the acoustic field.

It should be noted that the invention is applicable many types of fluid flows, both gaseous, such as air, and liquid, such as water in water pipes and hydraulic liquids.

Other specific types of fluid flows to which the invention is applicable are steam flows and combustion gas flows. Specific examples of applications are ventilation channels, pressurised air channels, exhaust pipes, hydraulic tubing, and water conduits.

Preferably, the acoustic energy dissipative wall presents, in relation to the interior of the flow channel, a smooth curvature. The smooth curvature will prevent Separation of the fluid flow from the wall, which prevention will further reduce the pressure drop.

Preferably, as can be seen in for example FIGS. 1, 2, 2a and 3, further described below, the sound dampening flow channel device comprises two acoustic energy dissipative walls, formed by a first and a second sheet defining between them the flow channel, said first and second sheets each being provided with at least one protrusion and/or indentation. Thereby, said protrusion and/or indentation can be arranged such that the outlet opening of the flow channel can not be seen from the inlet opening and vice versa. This means that the sound waves will impact against, the protrusion and/or indentation, whereby the sheets will absorb the sound waves, but allow the fluid flow to pass.

It should be noted that the examples shown in the enclosed figures do not limit the scope of the invention, which instead is defined by the claims.

Preferably, said protrusion and/or indentation is arranged such that the cross-sectional area of the flow channel is substantially constant. Thereby, the pressure drop is further reduced. A way of accomplishing this is to arrange a protrusion on one of the sheets extend partly into an indentation in a parallel sheet, and provide the surfaces of the protrusion and the indentation with similar shapes. In a special case of an extended cross-sectional shape of the flow channel, width of the latter is preferably constant.

Preferably, as can be seen in for example FIG. 20, further described below, the sound dampening flow channel device comprises an additional acoustic energy dissipative wall, formed by a third sheet defining together with said second sheet a second flow channel, said third sheet being provided with at least one protrusion and/or indentation. Thereby, said protrusion and/or indentation can be arranged such that the outlet opening of the second flow channel can not be seen from the inlet opening of the second flow channel and vice versa. As a result the fluid flow in a duct can be divided into a plurality of separate fluid flows, and the size of the protrusion and/or indentation can be kept relatively small while still accomplishing the features that the outlet opening of the flow channels can not be seen from the inlet opening of the flow channels and vice versa.

Preferably, said protrusion and/or indentation is arranged such that the cross-sectional area of the second flow channel is substantially constant.

Preferably, as can be seen in for example FIGS. 1, 2 and 2a, further described below, said protrusion comprises a ridge and said indentation comprises a valley, said ridge and valley being arranged such that the cross-sectional area of the flow channel is substantially constant.

In one embodiment, exemplified in FIG. 1, further described below, the ridge and the valley are essentially straight and extend essentially in the transverse direction in relation to direction of the flow channel. Alternatively, as exemplified in FIG. 3, further described below, the ridge and the valley each form a closed loop. Thereby, the ridge and the valley could be circular. As a further alternative, exemplified in FIG. 2, further described below, the ridge and the valley can each present a spiral shape.

In another embodiment, exemplified in FIG. 4, further described below, said protrusion comprises a bump and said indentation comprises a pit, said bump and pit being arranged such that the cross-sectional area of the flow channel is substantially constant.

Preferably, as exemplified in FIGS. 5 and 6, further described below, the sound dampening flow channel device comprises at least one guide wall oriented in an angle to the orientation of the first and second sheets, to guide a fluid flow in a plane being parallel with the first and second sheets. Thereby, the at least one guide wall can be oriented perpendicular to the first and second sheets, or in another angle to the latter.

Preferably, as exemplified in FIG. 7, further described below, at least two of the sheets are each provided with at least one opening, whereby openings in adjacent sheets are offset in a direction parallel to the sheets, so that a fluid flow is forced parallel to the sheets when passing from an opening in one of the sheets to an opening in an adjacent sheet.

In further embodiments, exemplified in FIGS. 8, 9 and 10, further described below, the sound dampening flow channel device comprises a tube, whereby at least one of the acoustic energy dissipative walls forms at least one divider providing a plurality of flow channels in the tube, at least one of the acoustic energy dissipative walls being twisted. Also, a non-twisted outer wall, or walls, of the tube can be provided as acoustic energy dissipative walls.

In yet further embodiments, exemplified in FIGS. 11 and 12, further described below, the acoustic energy dissipative wall is rolled, whereby at least one flow channel is formed between consecutive wrappings of the acoustic energy dissipative wall.

In further embodiments, exemplified in FIG. 15, further described below, the sound dampening flow channel device comprises a bent tube formed at least partly by the at least one acoustic energy dissipative wall.

As will also be explained further in the detailed description below, the acoustic energy dissipative wall can be provided in a number of ways. At least one of the acoustic energy dissipative walls could be provided as a porous wall, in a porous material with a high flow resistance, for example in a felt material or a glass fiber material or as filter paper, or with a plurality of micro-perforations. Alternatively, or in combination, at least one of the acoustic energy dissipative walls could comprise a sheet with a dampening layer.

Instead of being provided with a dampening layer, at least one of the acoustic energy dissipative walls could be made of a material having an inherently high vibration loss factor, such as plastic materials, in particular EVA, acrylics or silicone. Such a wall could be provided microperforations. The latter have, besides providing absorption by acoustic resistance, the effect of increasing the vibration loss factor of the wall.

DESCRIPTION OF THE DRAWINGS

Below, embodiments of the invention will be described in detail, with the aid of the drawings, in which.

DETAILED DESCRIPTION

Figure 1:
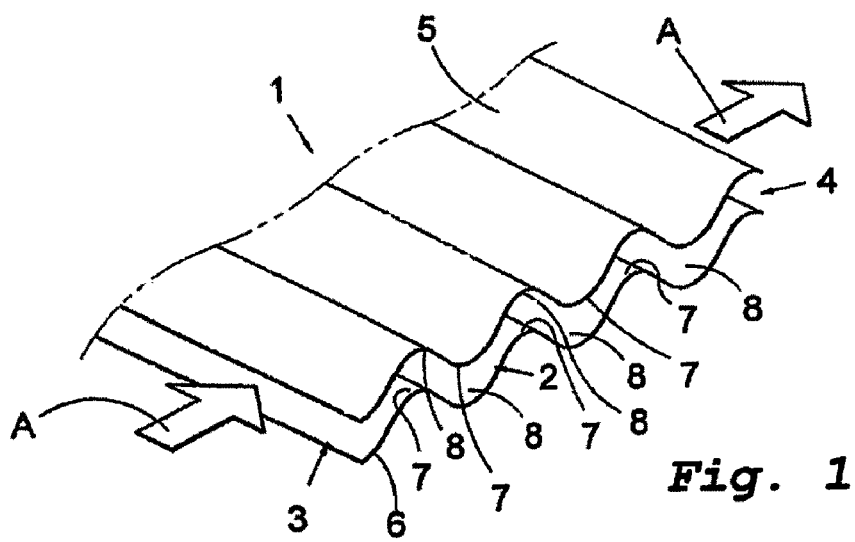
FIG. 1 is a perspective cross-sectional view of a part of a sound dampening flow channel device according to one embodiment of the invention.

FIG. 1 shows a perspective cross-sectional view of a part of a sound dampening flow channel device 1 according to one embodiment of the invention. The device 1 defines a flow channel 2 having an inlet opening 3 and an outlet opening 4. The direction of a fluid flow is indicated with arrows A. The flow channel 2 is partly delimited by two acoustic energy dissipative walls 5, 6. The flow channel can further be delimited by two walls not shown in FIG. 1, oriented perpendicular to the acoustic energy dissipative walls 5, 6.

The two acoustic energy dissipative walls 5, 6 are formed by a first sheet 5 and a second sheet 6 defining between them the flow channel 2. The first and second sheets 5, 6 are each provided with a plurality of protrusions 7 and indentations 8. The protrusions 7 and indentations 8 are arranged such that the outlet opening 4 of the flow channel 2 can not be seen from the inlet opening 3 and vice versa.

Each protrusion 7 forms a ridge 7 and each indentation 8 forms a valley 8. The ridges 7 and the valleys 8 are essentially straight and extend essentially in the transverse direction in relation to direction of the flow channel 2.

Further, the ridges and valleys 7, 8 are arranged such that the cross-sectional area of the flow channel 2 is substantially constant. Thereby, a ridge 7 on one of the sheets 5 extends partly into a valley 8 in the parallel sheet 6, the valley 8 being located opposite to the ridge 7, and the surfaces of the ridge 7 and the valley 8 have similar shapes. In this example, the ridges and valleys provide a sinusoidal form to the sheets 5, 6, whereby the phase shift of the sine curves are the same for the two sheets 5, 6. In other words, the sheets 5, 6 are arranged to fit into each, by the distance between the sheets 5, 6 being less than the amplitude of the sine waves. Thereby, the outlet opening 4 of the flow channel 2 can not be seen from the inlet opening 3 and vice versa. Sound waves in die flow channel 2 will impact against the surfaces of the ridges/valleys 7, 8 and will thereby be absorbed. Further, the sine waves provide the acoustic energy dissipative walls 5, 6 with a smooth curvature which minimizes the risk of separation of the fluid flow from the channel surfaces, and therefore the pressure drop is kept to a minimum.

The sheets 5, 6 can be inserted as sound dampeners in a fluid flow duct, or alternatively form themselves walls of such a duct. In the former case, the sheets 5, 6 are preferably thin. Preferably, the thickness is within the range 0.001-3 mm, preferably 0.01 mm-1 mm. The sheets can be formed by micro perforated metal or plastic sheets, copper or brass foil, polymer fibre fabric, metal fibres, textile fibres, glass fibres or mineral wool fibres, non woven cloth in polymer, e.g. polyester or polypropylene, polyamide, polyethylene, cellulose/paper, or woven cloth in metal. Where suitable these materials are used with a proper bonding agent. Advantageously, metal, plastic foil or paper with a high damping factor is used. Suitable production methods can be thermoforming, pressing, forming with a supplement of a hardening bonding agent, sintering or methods using dryer fabrics. The acoustic energy dissipative quality of the sheets 5, 6 will be provided as described closer below. The low thickness will minimize the reduction of the flow cross-section.

In FIG. 1 only two sheets 5, 6 are shown, but alternatively three or more sheets can be provided in the manner described above. More particularly, an additional acoustic energy dissipative wall can be provided and formed by a third sheet defining together with said second sheet 6 a second flow channel (not shown) parallel to the flow channel 2. Said third sheet can be formed similarly to the sheets 5, 6 shown in FIG. 1, and located in relation to the second sheet 6 similarly to the location of the second sheet 6 in relation to the first sheet 5.

Figure 2:
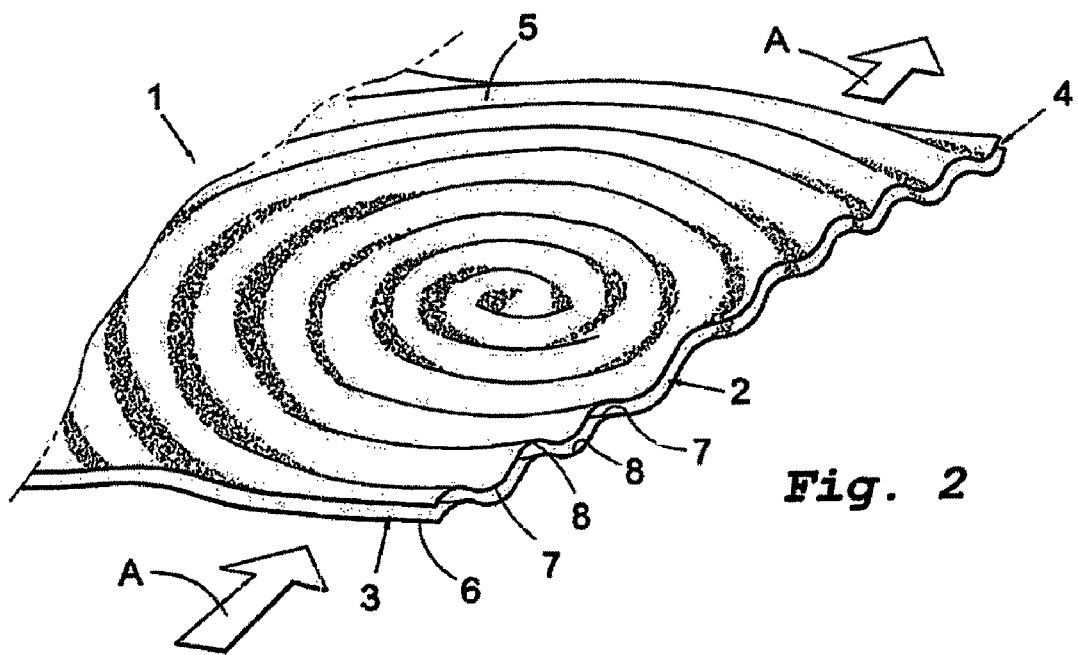
FIG. 2 is a perspective cross-sectional view of a part of a sound dampening flow channel device according to another embodiment of the invention.

FIG. 2 shows a perspective cross-sectional view of apart of a sound dampening flow channel device 1 according to another embodiment of the invention. It is similar to the embodiment described with reference to FIG. 1. Thus, the device 1 defines a flow channel 2 having an inlet opening 3 and an outlet opening 4. The direction of a fluid flow is indicated with arrows A. The flow channel 2 is partly delimited by two acoustic energy dissipative walls 5, 6.

The two acoustic energy dissipative walls 5, 6 are formed by a first sheet 5 and a second sheet 6 defining between them the flow channel 2. The first and second sheets 5, 6 are each provided with a protrusion 7 and an indentation 8. The protrusion 7 forms a ridge 7 and the indentation 8 forms a valley 8, each presenting a spiral shape.

Similar to the embodiment described above, the ridges and valleys 7, 8 are arranged such that the cross-sectional area of the flow channel 2 is substantially constant. Thereby, the ridge 7 on the first, sheet 5 extends partly info the valley 8 of the second sheet 6, the valley 8 being located opposite to the ridge 7, and the surfaces of the ridge 7 and the valley 8 have similar shapes. In this example, as seen in a cross-section oriented through the centre of the spiral, the ridges and valleys provide a sinusoidal form to the sheets 5, 6, whereby the phase shift of the sine curves are the same for the two sheets 5, 6. In other words, the sheets 5, 6 are arranged to fit into each, by the distance between the sheets 5, 6 being less than the amplitude of the sine waves. Thereby, the outlet opening 4 of the flow channel 2 can not be seen from the inlet opening 3 and vice versa.

As an alternative to the spiral shape shown in FIG. 2, ridges and valleys can be provided so as for each to form a closed loop. Thereby, they can be circular, elliptic, or have some other closed loop shape.

Figure 3:
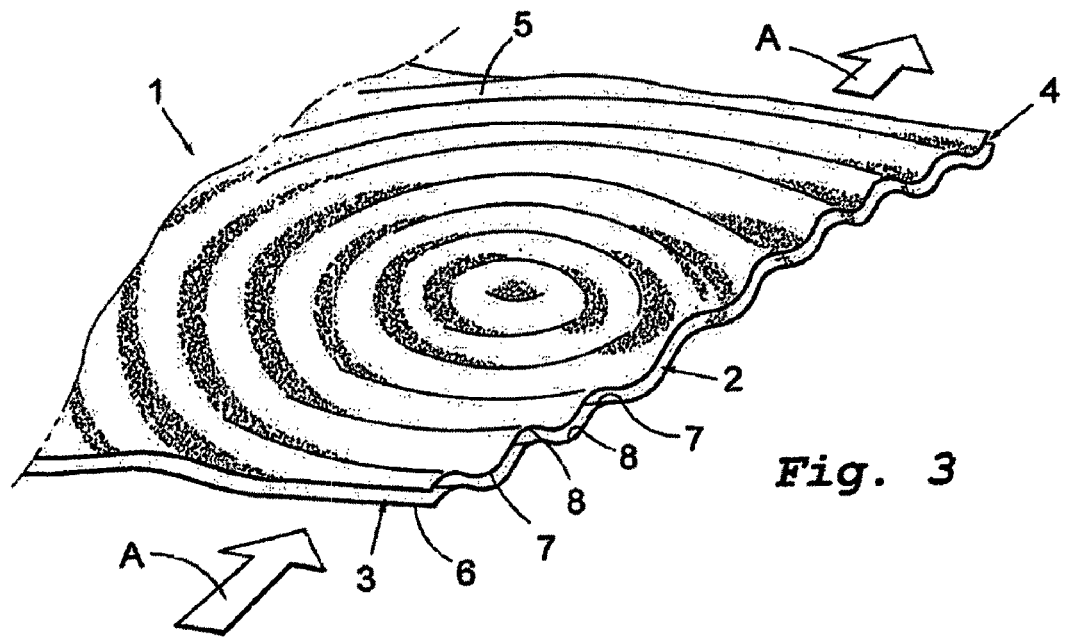
FIG. 3 shows a perspective cross-sectional view of a part of a sound dampening flow channel device according to a further embodiment of the invention.

FIG. 3 shows an embodiment with such closed loops. In particular, FIG. 3 shows a perspective cross-sectional view of a part of a sound dampening flow channel device 1 according to a further embodiment of the invention. It is similar to the embodiment described with reference to FIG. 2, and corresponding parts have the same respective reference numeral.

In FIG. 3, two acoustic energy dissipative walls 5, 6 are formed by a first sheet 5 and a second sheet 6 defining between them the flow channel 2. The first and second sheets 5, 6 are each provided with a plurality of protrusions 7 and indentations 8. The protrusions 7 form ridges 7 and the indentations 8 form valleys 8, each presenting a circular shape.

Similar to the embodiments described above, the ridges and valleys 7, 8 are arranged such that the cross-sectional area of the flow channel 2 is substantially constant. Thereby, ridges 7 on the first sheet 5 extend partly into corresponding valleys 8 of the second sheet 6, the valleys 8 being located opposite to the respective ridges 7, and the surfaces of the ridges 7 and the valleys 8 have similar shapes. As seen in a cross-section oriented through the centre of the circles, the ridges and valleys provide a sinusoidal form to the sheets 5, 6, whereby the phase shift of the sine curves are the same for the two sheets 5, 6. In other words, the sheets 5, 6 are arranged to fit into each, by the distance between the sheets 5, 6 being less than the amplitude of the sine waves.

The embodiment in FIG. 3 has the advantage that it is very easy to manufacture from readily available sheets.

Figure 4:
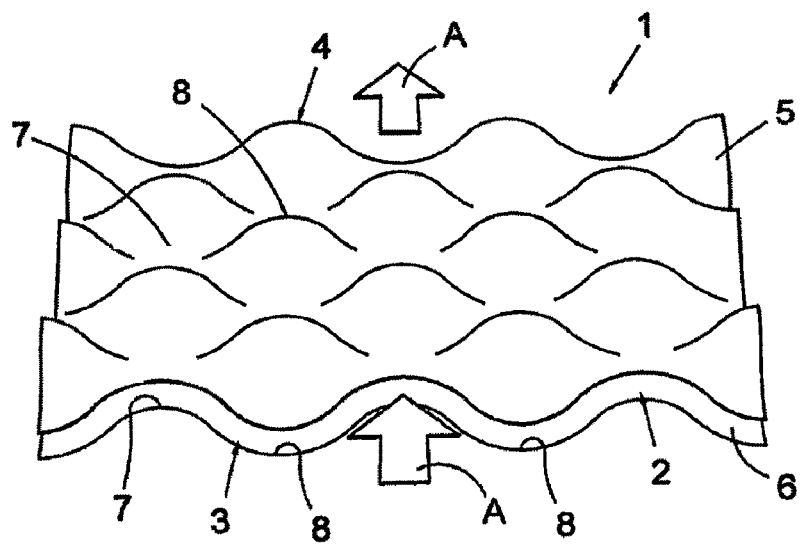
FIG. 4 is a perspective cross-sectional view of apart of a sound dampening flow channel device according to yet another embodiment of the invention.

FIG. 4 shows a perspective cross-sectional view of apart of a sound dampening flow channel device according to yet another embodiment, of the invention. It is similar to the embodiments described with reference to FIGS. 1 and 2. Thus, the device 1 defines a flow channel 2 having an inlet opening 3 and an outlet opening 4. The direction of a fluid flow is indicated with arrows A. The flow channel 2 is partly delimited by two acoustic energy dissipative walls 5, 6.

The two acoustic energy dissipative walls 5, 6 are formed by a first sheet 5 and a second sheet 6 defining between them the flow channel 2. The first and second sheets 5, 6 are each provided with a plurality of protrusions 7 and indentations 8, as seen from the interior of the flow channel 2. Each protrusion 7 comprises a bump 7 and said indentation 8 comprises a pit 8, said bump 7 and pit 8 being arranged such that the cross-sectional area of the flow channel 2 is substantially constant.

Similar to the embodiments described above, the bumps 7 and pits 8 are arranged such that the cross-sectional area of the flow channel 2 is substantially constant. Thereby, a bump 7 on the first sheet 5 extends partly info a pit 8 of the second sheet 6, the pit 8 being located opposite to the bump 7, and the surfaces of the bump 7 and the pit 8 have similar shapes. In this example, as seen in a cross-section, the bumps 7 and the pits 8 provide a sinusoidal form to the sheets 5, 6, whereby the phase shift of the sine curves are the same for the two sheets 5, 6. In other words, the sheets 5, 6 are arranged to fit into each, by the distance between the sheets 5, 6 being less than the amplitude of the sine waves. Thereby, the outlet opening 4 of the flow channel 2 can not be seen from the inlet opening 3 and vice versa.

In FIG. 4 the bumps are arranged in relation to each other in a rectangular manner, but alternatively they could form hexagonal shapes. Whether provided with bumps arranged in a rectangular or hexagonal manner, such an embodiment has the advantage that it is very easy to manufacture from readily available sheets.

Figure 5:
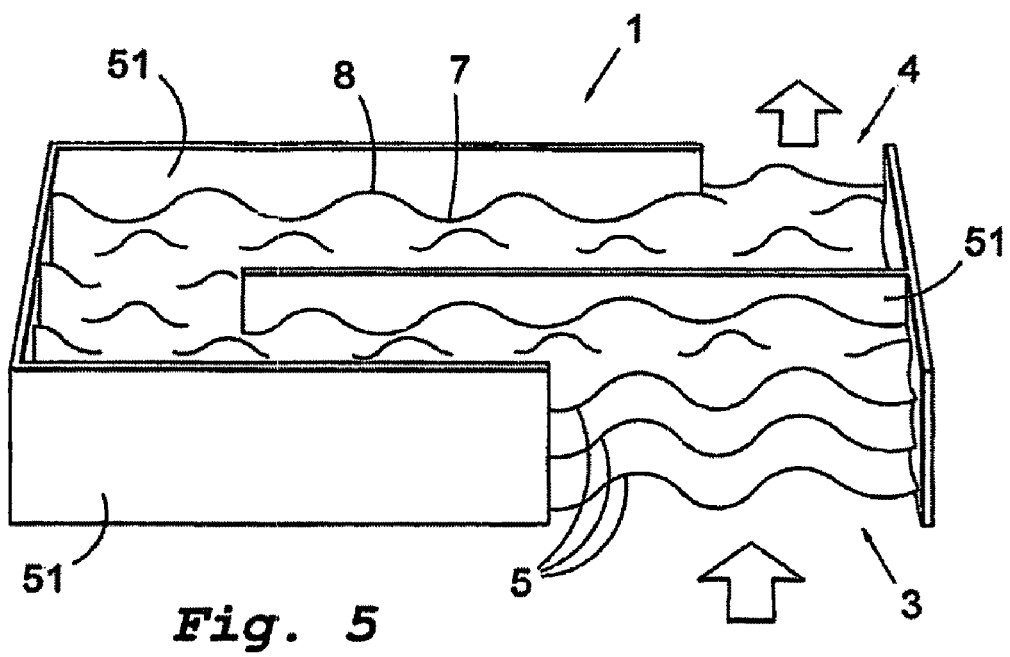
FIG. 5 shows a perspective view of a sound dampening flow channel device according to a further embodiment of the invention.

FIG. 5 shows a perspective view of a sound dampening flow channel device according to a further embodiment of the invention. The device 1 defines two flow channels having an inlet opening 3 and an outlet opening 4. Each flow channel is partly delimited by two acoustic energy dissipative walls 5.

Thus, the device in FIG. 5 comprises three acoustic energy dissipative walls 5 formed by sheets 5 defining between them the flow channels. As in the embodiment in FIG. 4, the sheets 5 are each provided with a plurality of protrusions 7 and indentations 8, as seen from the interior of the flow channels, whereby each protrusion 7 comprises a bump 7 and said indentation 8 comprises a pit 8. Thereby, a bump 7 on one of the sheets 5 extends partly into a pit 8 of another sheet 5, the pit 8 being located opposite to the bump 7, and the surfaces of the bump 7 and the pit 8 have similar shapes.

Figure 6:
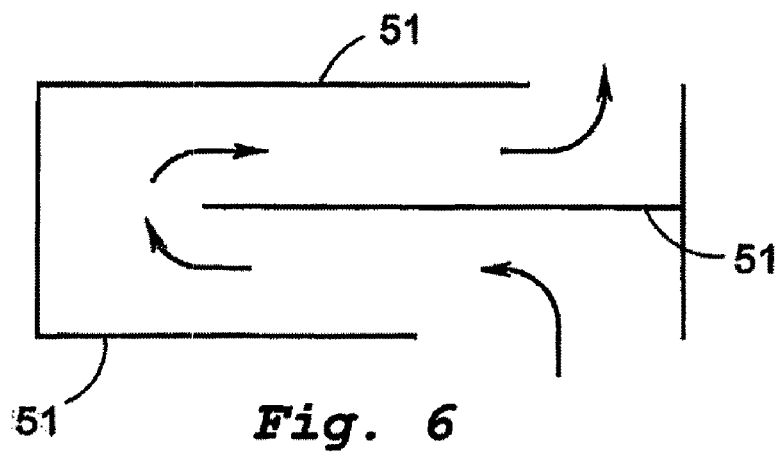
FIG. 6 shows a plan view of parts of the device in FIG. 5.

The sound dampening flow channel device comprises guide walls 51 oriented in an angle to the general orientation, of the pit and bump provided sheets 5, in this case perpendicular to the orientation of the latter. The guide walls 51 extend through the entire stack of pit and bump provided sheets 5. In FIG. 6, it can be seen how the guide walls 51 forces the flow in a path through the sound dampening flow channel device. It can be said that the embodiment in FIGS. 5 and 6 provides a second dimension to the fluid flow.

Such guide walls 51 can also be used in conjunction with sheets with shapes as shown in FIG. 1, 2 or 2a. However, the sheets 5 shown in FIG. 5 are especially advantageous to be used together with such guide walls 51, since they force the flowing fluid in an up and down motion, independently of the horizontal direction of the flow.

As can be seen in FIG. 5, some guide walls 51 are provided at edges of the device, while one extends through the stack of sheets 5 at a distance from the edges of the device. In any case, in manufacturing the guide walls 51 can be integrated with the stack of sheets 5 in an easy manner. A guide wall 51 intended to extend through the stack of sheets 5 at a distance from the edges of the device can be incorporated simply by milling slots in the sheets 5, inserting the guide wall 51 in the slots, and securing it to the sheets 5, e.g. by welding.

Figure 7:
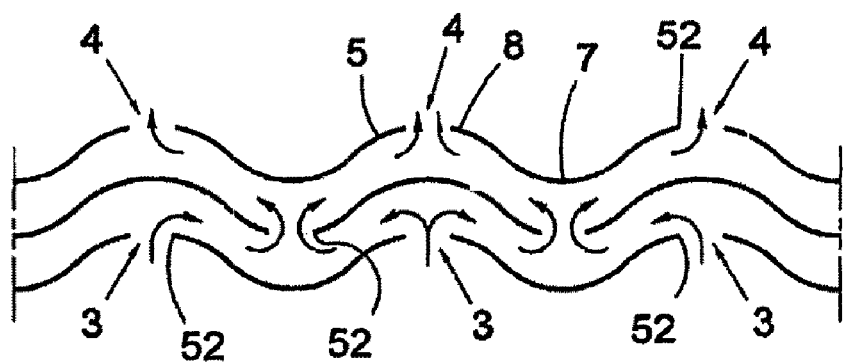
FIG. 7 shows a schematic cross-sectional view of a sound dampening flow channel device according to yet a further embodiment of the invention.

FIG. 7 shows a schematic cross-sectional view of a sound dampening flow channel device according to yet a further embodiment of the invention. The device defines a plurality of flow channels comprising a plurality of inlet openings 3 and outlet openings 4. The flow channels are partly delimited by three acoustic energy dissipative walls 5, formed by sheets 5 defining between them the flow channels. The sheets 5, provided with protrusions 7 and indentations 8, can for example be of the types shows in FIG. 1, 2, 2a or 3.

The sheets 5 are provided with openings 52, whereby openings in adjacent sheets are offset in a direction parallel to the sheets 5. Thereby, a fluid flow is forced parallel to the sheets between passing successive openings 52 in the stack of sheets. It can be said that the embodiment in FIG. 7 provides a third dimension to the fluid flow. Optionally, it can be used in conjunction with guide walls 51 as shown in FIG. 5.

Figure 8:
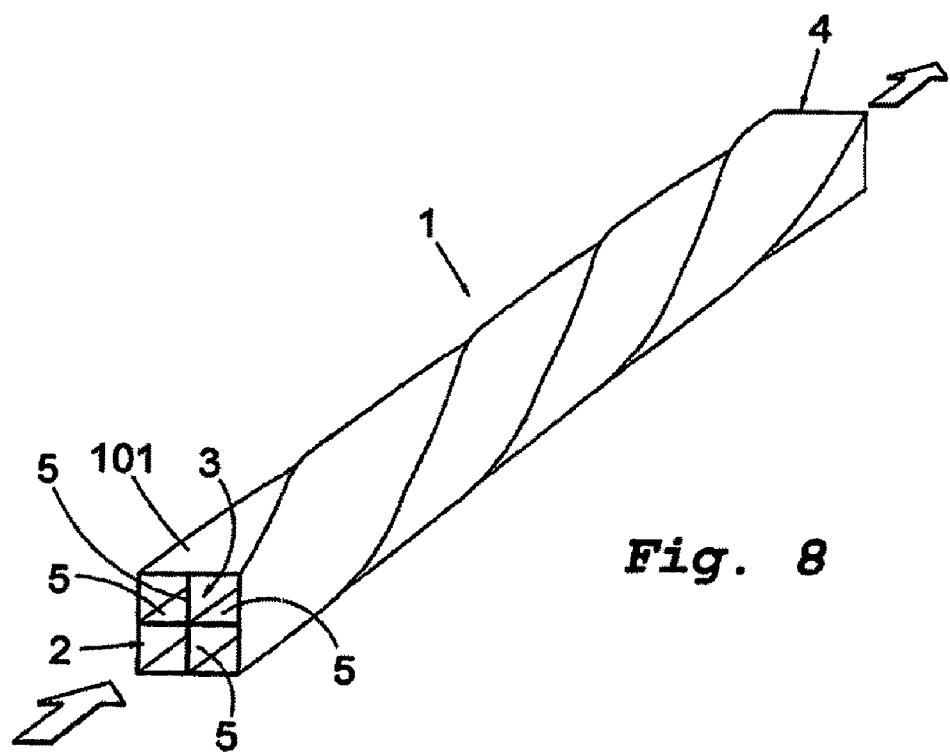
FIG. 8 is a perspective view of a sound dampening flow channel device according to still another embodiment of the invention.

FIG. 8 shows a perspective view of a sound dampening flow channel device according to still another embodiment of the invention. A sound dampening flow channel device 1 comprises a tube 101, and four acoustic energy dissipative walls 5 form dividers providing a four of flow channels 2 in the tube 101. Each flow channel 2 has an inlet opening 3 and an outlet opening 4. As can be seen in FIG. 8, the tube 101 is twisted, and also the acoustic energy dissipative walls 5 are twisted. Thereby, the outlet opening 4 of the flow channel 2 can not be seen from the inlet opening 3 and vice versa. Sound waves in the flow channels 2 will impact against the surfaces of the acoustic energy dissipative walls 5 and will thereby be absorbed. Further, the twist provide the acoustic energy dissipative walls 5 with a smooth curvature which minimizes the risk of separation of the fluid flow from the channel surfaces, and therefore the pressure drop is kept to a minimum.

Figure 9:
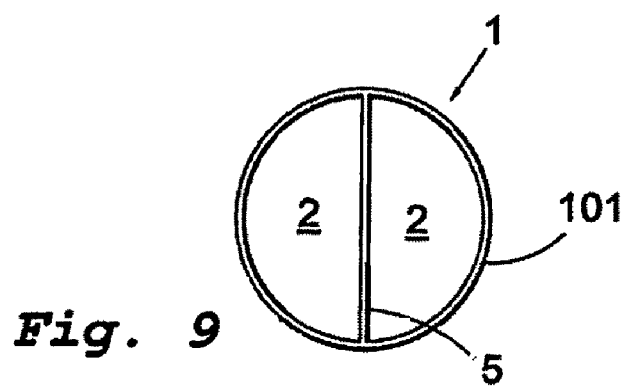
FIG. 9 presents an end view of a sound dampening flow channel device according to yet another embodiment of the invention.
Figure 10:
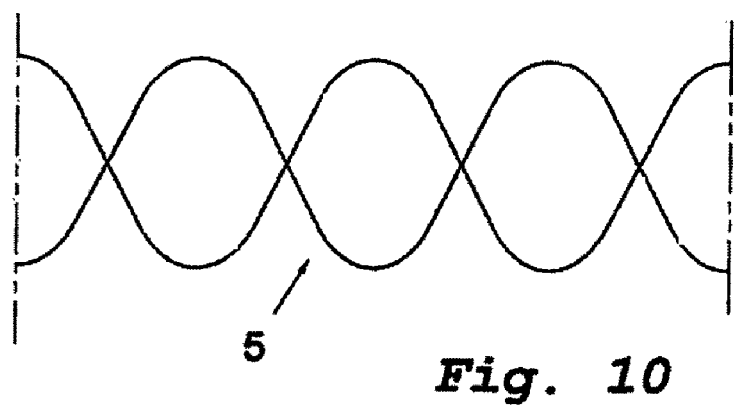
FIG. 10 is a side view of a part of the sound dampening flow channel device in FIG. 9.

FIG. 9 shows an end view of a sound dampening flow channel device according to yet another embodiment of the invention. A sound dampening flow channel device 1 comprises a round tube 101, and an acoustic energy dissipative wall 5 forms a divider providing a two of flow channels 2 in the tube 101. FIG. 10 shows a side view of the wall 5, and it can be seen that it is twisted. Thereby, an outlet opening of either of the flow channels 2 can not be seen from an inlet opening of it. Sound waves will thereby be absorbed and the pressure drop will be kept to a minimum for the same reason as pointed out above in connection to FIG. 8.

Alternatively, the wall 5 in the embodiment shown in FIGS. 9 and 10 is corrugated, much like a spiral that is commonly used to decorate Christmas trees. This will provide for a simple production of the sound dampening flow channel device.

Figure 11:
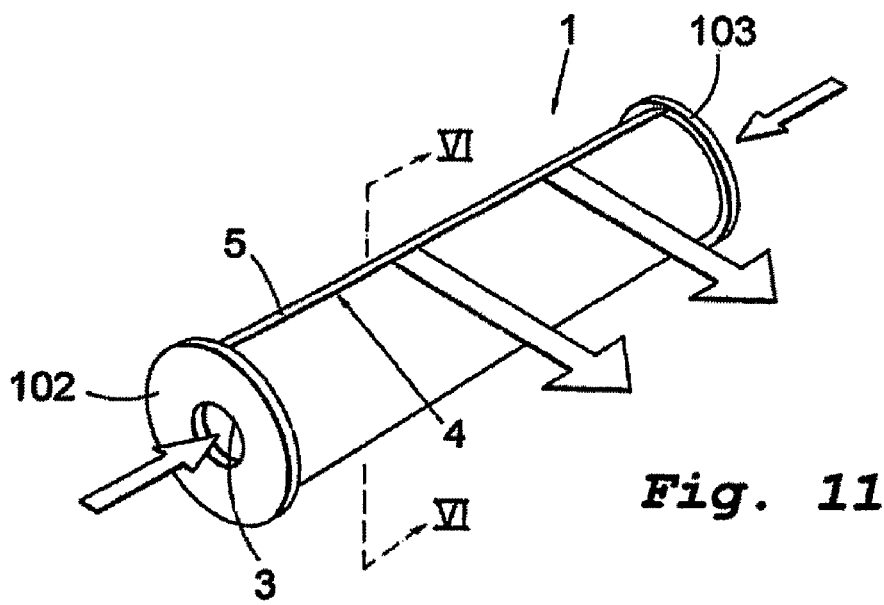
FIG. 11 is a perspective view of a sound dampening flow channel device according to a further embodiment of the invention.
Figure 12:
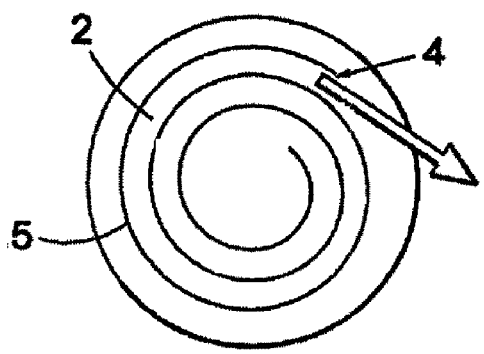
FIG. 12 is a cross-sectional view with the section being oriented as indicated by the lines VI-VI in FIG. 11, FIGS. 13 and 14 show cross-sections of sound dampening flow channel device according to yet further embodiments of the invention.

FIGS. 11 and 12 show a sound dampening flow channel device 1 according to a further embodiment of the invention. The device 1 comprises an acoustic energy dissipative wall 5 which is rolled, whereby a flow channel 2 is formed between consecutive wrappings of the acoustic energy dissipative wall 5.

End walls 102, 103 are provided at each end of the rolled acoustic energy dissipative wall 5. The flow channel 2 has two inlet openings 3 in each of the end walls. Alternatively, it could have more than one inlet opening in each end wall. As a further alternative, the flow channel 2 has one or more inlet openings 3 in only one of the end walls. An outlet opening 4 of the flow channel is provided by an outer edge of the rolled acoustic energy dissipative wall 5. The rolled configuration of the acoustic energy dissipative wall 5 gives as a result that the outlet opening 4 of the flow channel 2 can not be seen from the inlet openings 3 and vice versa. Therefore, sound waves in the flow channels 2 will impact against the surfaces of the acoustic energy dissipative walls 5 and will thereby be absorbed. Further, the roll provide the acoustic energy dissipative wall 5 with a smooth curvature which minimizes the risk of separation of the fluid flow from the channel surfaces, and therefore the pressure drop is kept to a minimum.

Figure 13:
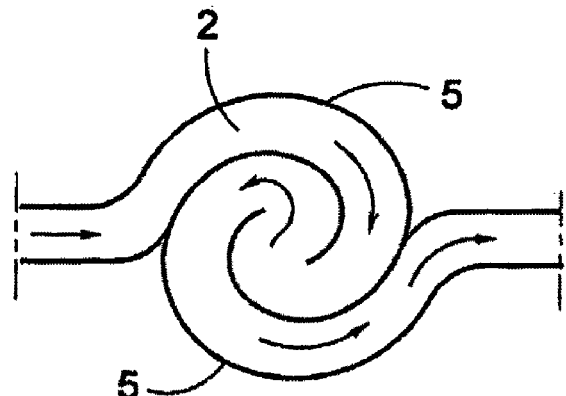

FIG. 13 shows a cross-section of a sound dampening flow channel device according to yet a further embodiment of the invention. The device 1 comprises two acoustic energy dissipative walls 5 which are rolled, and positioned so that the rolls formed are intertwined. Thereby a flow channel 2 is formed between consecutive wrappings of the intertwined acoustic energy dissipative walls 5.

Figure 14:
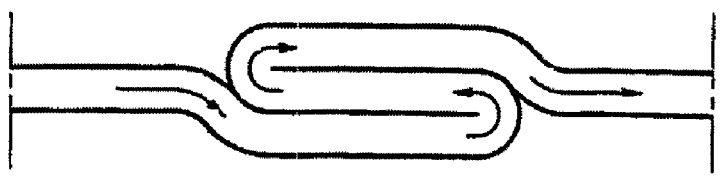

FIG. 14 shows a cross-section of a sound dampening flow channel device according to another embodiment of the invention. The device is similar to the one shown in FIG. 13, differing in that it has a flatter form, which makes it suitable for applications where space is limited.

Figure 15:
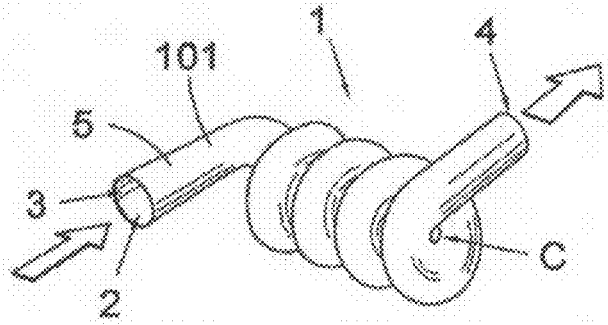
FIG. 15 is a perspective view of a sound dampening flow channel device according to an alternative embodiment of the invention.

FIG. 15 shows a perspective view of a sound dampening flow channel device 1 according to an alternative embodiment of the invention. The device 1 comprises a bent tube 101 formed by an acoustic energy dissipative wall 5. The tube 101 forms a flow channel 2 that has an inlet opening 3 and an outlet opening 4. Since the tube is bent, the outlet opening 4 of the flow channel 2 can not be seen from the inlet opening 3 and vice versa. Therefore, sound waves in the flow channel 2 will impact against the inner surface of the acoustic energy dissipative wall 5 and will thereby be absorbed. Further, the bend provides the acoustic energy dissipative wall 5 with a smooth curvature which minimizes the risk of separation of the fluid flow from the channel surfaces, and therefore the pressure drop is kept to a minimum. It should be noted that the wall 5 of the tube 101 extend essentially all the way into the center C of the helix formed by the tube. Thereby, a space effective device is provided.

Figure 16:
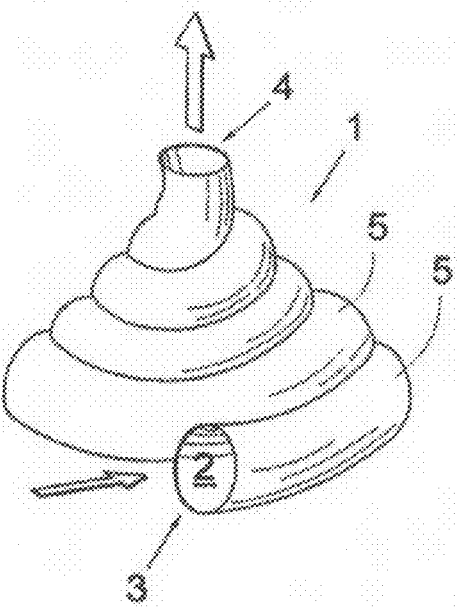
FIG. 16 is a perspective view of a sound dampening flow channel device according to a further alternative of the invention.

FIG. 16 shows a perspective view of a sound dampening flow channel device 1 according to a further alternative of the invention. The device 1 is arranged so as to present a flow channel having an inlet opening 3 and an outlet opening 4, the flow channel 2 being delimited by acoustic energy dissipative walls 5. Thereby the flow channel is provided with a spiral and helical form so that ascends while its radius is decreasing.

Figure 17:
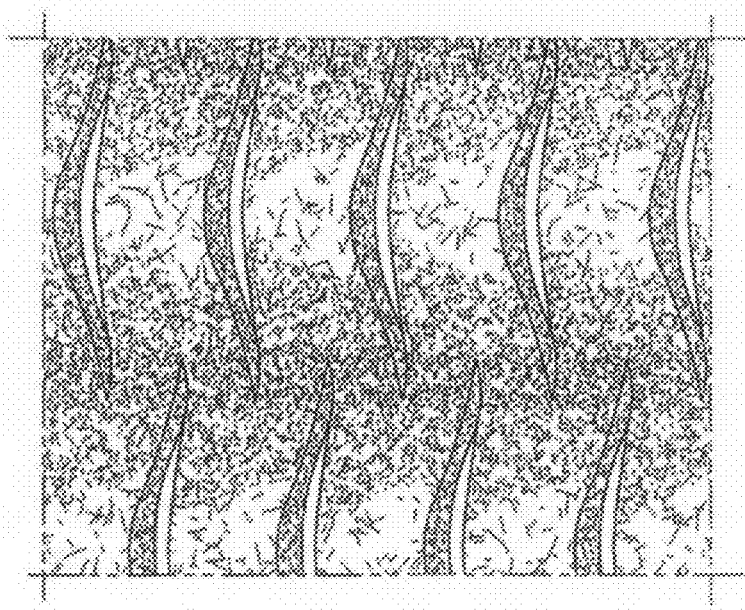
FIG. 17 is a plan view of a detail of a sound dampening flow channel device according to one embodiment of the invention.
Figure 18:
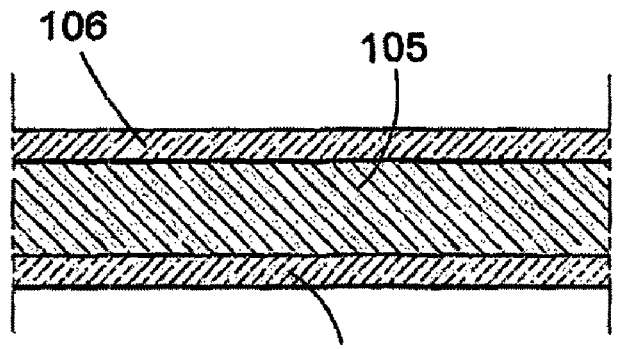
FIG. 18 is a cross-sectional view of a detail of a sound dampening flow channel device according to another embodiment of the invention.

As mentioned above, the acoustic energy dissipative wall can be provided with a plurality of micro-perforations. These can be of any suitable shape, for example in the form of cylindrical micro bores, or of micro slits, as described, in EP0876539B1 and shown in FIG. 17. Micro bores or micro slits can be obtained by any suitable process, such as laser cutting, shear tool cutting, or drilling. Alternatively, the acoustic energy dissipative wall can comprise a sheet, produced as discussed above with reference to FIG. 1, whereby the sheet is provided with a dampening layer, which will have a vibration dampening effect on the thin sheets. As a further alternative, referring to FIG. 18 the acoustic energy dissipative wall can comprise a dampening layer 104 between two sheets 105, sometimes referred to as an MPM-(Metal Plastic Metal)-sheet. Instead the acoustic energy dissipative wall can be provided as a so called RPR-(Rubber Plastic Rubber)-sheet.

Preferably, the sound dampening flow channel device according to the invention is arranged so as to provide a maximum sound energy dissipation through a plurality of dissipation processes resulting in thermal losses, such as a) absorption by the acoustic resistance, b) membrane absorption (mass related excitation with vibration losses), c) coincidence absorption (vibration losses), and d) elastic strain losses.

Absorption by acoustic resistance can be provided by porous materials, such as non-woven materials, or sheets provided with micro bores as described above, or a microperforated wall as described above with reference to FIG. 17.

Figure 19:
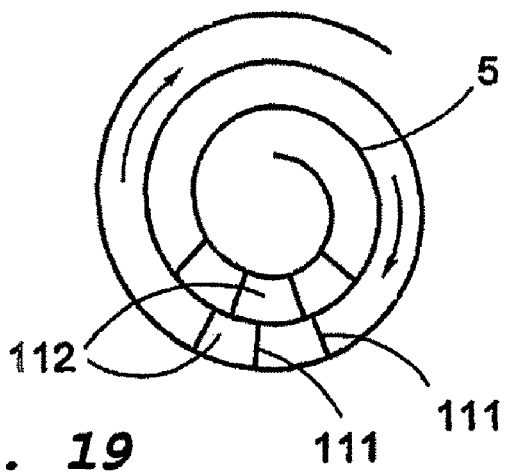
FIG. 19 shows schematically the flow channels in the embodiment in FIGS. 11 and 12.
Figure 20:
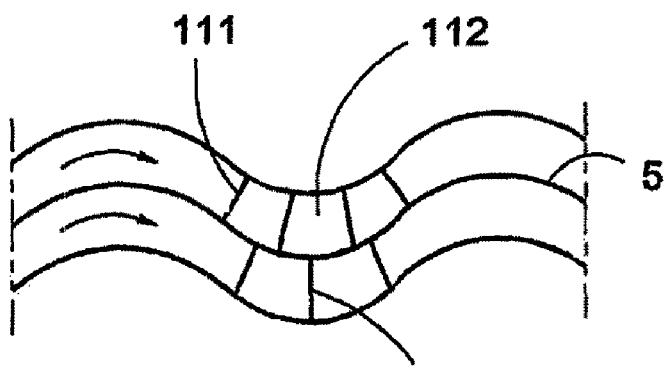
FIG. 20 shows schematically flow channels in a further embodiment of the invention.

The membrane absorption is bending waves depending on the mass end stiffness of the wall. In any embodiment of the invention, where adjacent flow channels are separated by an acoustic energy dissipative wall, see e.g. FIGS. 8, 9, 10, 11 and 12, such a wall 5 is preferably thin, more preferably within the range 0.01 mm-1 mm. This will enhance the sound dampening by membrane absorption. FIG. 19 shows schematically the flow channel form presented by the embodiment in FIGS. 11 and 12. FIG. 20 illustrates the flow through flow channels formed by walls of the shape shown in FIG. 1 above. In FIGS. 19 and 20 the flow direction is indicated with arrows. Lines 111, perpendicular to the flow direction depict high pressure regions of propagating sound waves, and low pressure regions are indicated by the reference numeral 112. It can be seen that certain high pressure regions 111 will occur adjacent to low pressure regions 112 in an adjacent flow channel. Since the dividing wall 5 is thin, it will deform due to these pressure differences, and this will remove energy from the sound waves.

Coincidence absorption is a resonance phenomenon that is dependent on the natural wavelength of the wall. Plastic materials are advantageous in that they have a high vibration loss factor and thereby provide for a high coincidence absorption of the sound energy. Preferably, the vibration loss factor for the material of the wall 5 is at least 0.1.

In addition to providing for membrane absorption, the thin wall 5 has the advantage that it takes very little room, and does not reduce the flow cross-sectional area significantly. The thin wall 5 can be made of metal or plastic sheets, aluminium, copper or brass foil, polymer fibre fabric, metal fibres, textile fibres, glass fibres or mineral wool fibres, non woven cloth in polymer, cellulose/paper, or woven cloth in metal.

Elastic strain losses depend on the level of strains occurring in the plane of the wall. To enhance this type of losses, preferably the wall is thin, as described above, and an elastic material is used, such as rubber or a soft plastic material.

The invention claimed is:

1. A sound dampening flow channel device defining at least two flow channels, each comprising an inlet opening and an outlet opening, wherein the outlet opening of each flow channel cannot be seen from the inlet opening and vice versa, wherein the flow channels are at least partly delimited by a stack of at least three single-walled acoustic energy dissipative sheets, wherein each single-walled sheet has a thickness within the range of 0.001 to 3 mm, wherein a first and a second of the single-walled sheets define between them a first flow channel and wherein the second single-walled sheet and a third of the single walled sheets define between them a second flow channel, said first, second, and third single-walled sheets each being provided with a plurality of protrusions or indentations, or combinations thereof, wherein the protrusions or indentations or combinations thereof are arranged such that fluid flowing through either of the first or second flow channel is simultaneously directed laterally and vertically from a longitudinal path, and wherein the flow channel device dampens audible sounds.

2. A sound dampening flow channel device according to claim 1, wherein the single-walled acoustic energy dissipative sheets present, in relation to the interior of at least the first flow channel, a smooth curvature.

3. A sound dampening flow channel device according to claim 1, wherein said plurality of protrusions or indentations, or combinations thereof is arranged such that the cross-sectional area of at least the first flow channel is substantially constant.

4. A sound dampening flow channel device according to claim 1, wherein said protrusion, or indentation, or combination thereof is arranged such that the cross-sectional area of the second flow channel is substantially constant.

5. A sound dampening flow channel device according to claim 1, wherein at least one of said protrusions comprises a ridge and at least one of said indentations comprises a valley, said ridge and valley being arranged such that the cross-sectional area of at least the first flow channel is substantially constant.

6. A sound dampening flow channel device according to claim 5, wherein the ridge and the valley are essentially straight and extend essentially in the transverse direction in relation to direction of at least the first flow channel.

7. A sound dampening flow channel device according to claim 5, wherein the ridge and the valley each form a closed loop.

8. A sound dampening flow channel device according to claim 7, wherein the ridge and the valley are circular.

9. A sound dampening flow channel device according to claim 5, wherein the ridge and the valley each present a spiral shape.

10. A sound dampening flow channel device according to claim 1, wherein said protrusion comprises a bump and said indentation comprises a pit, said bump and pit being arranged such that the cross-sectional area of at least the first flow channel is substantially constant.

11. A sound dampening flow channel device according to claim 1, comprising at least one guide wall oriented in an angle to the orientation of the first, second, and third single-walled sheets, to guide a fluid flow in a plane being parallel with the first, second, and third single-walled sheets.

12. A sound dampening flow channel device according to claim 1, whereby at least two of the single-walled sheets are each provided with at least one opening, whereby openings in adjacent single-walled sheets are offset in a direction parallel to the single-walled sheets, so that a fluid flow is forced parallel to the single-walled sheets when passing from an opening in one of the single-walled sheets to an opening in an adjacent single-walled sheet.

13. A sound dampening flow channel device according to claim 1, wherein the single-walled acoustic energy dissipative sheets are rolled, whereby at least one flow channel is formed between consecutive wrappings of the single-walled acoustic energy dissipative sheets.

14. A sound dampening flow channel device according to claim 1, whereby at least one of the acoustic energy dissipative walls is provided with a plurality of micro-perforations.

15. A sound dampening flow channel device according to claim 1, whereby at least one of the single-walled acoustic energy dissipative sheets has an acoustic impedance which corresponds to about 0.1 to 10 times the wave impedance of the flowing fluid.

16. A sound dampening flow channel device according to claim 1, whereby the vibration loss factor for the material of at least one of the single-walled acoustic energy dissipative sheets is at least 0.1.

17. A sound dampening flow channel device according to claim 1, wherein the thickness of at least one of the single-walled acoustic energy dissipative sheets is within the range 0.01 mm-1 mm.

18. A sound dampening flow channel device according to claim 15, wherein the acoustic impedance corresponds to about 0.5 to 5 times the wave impedance of the flowing fluid.

19. A sound dampening flow channel device according to claim 15, wherein the acoustic impedance corresponds to about 1 to 3 times the wave impedance of the flowing fluid.

20. A sound dampening flow channel device according to claim 1, wherein the sound dampening flow channel device only dissipates acoustic energy by the single-walled acoustic dissipative sheets and wherein the device contains no additional sound insulating material.

21. A sound dampening flow channel device according to claim 1, wherein the single-walled sheets are made of metal or plastic.

* * * * *